Oct. 15, 1935.       M. M. BURGESS       2,017,681
STEERING WHEEL
Filed May 4, 1934

INVENTOR
Magnus M. Burgess,
BY
Owen & Owen,
ATTORNEYS.

Patented Oct. 15, 1935

2,017,681

UNITED STATES PATENT OFFICE 2,017,681

STEERING WHEEL

Magnus M. Burgess, Detroit, Mich., assignor to Sheller Manufacturing Corporation, Portland, Ind., a corporation of Indiana Application May 4, 1934, Serial No. 723,950

4 Claims. (Cl. 74—552)

This invention relates to steering wheels of the type used more particularly in connection with motor driven vehicles and which wheels are grasped by the driver, and has for its object the provision of simple and efficient means disposed within the hub of a steering wheel for absorbing to a considerable extent the continuous vibrations of the motor and the shocks which would otherwise be communicated to the wheel rim from the steering post during a running of the vehicle over rough pavements or the like.

The invention is fully described in the following specification, and while in its broader aspect it is capable of embodiment in numerous forms, a few embodiments thereof are illustrated in the accompanying drawing, in which—

Figure 1:
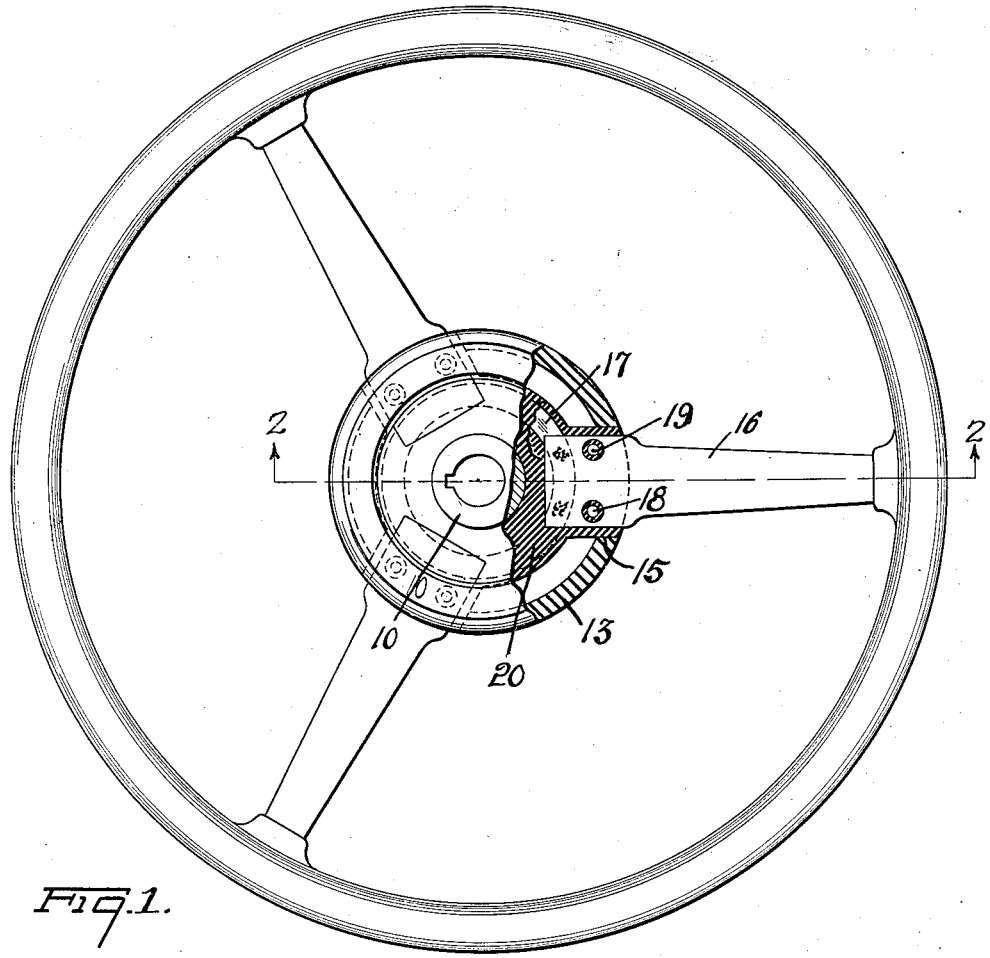
Figure 2:
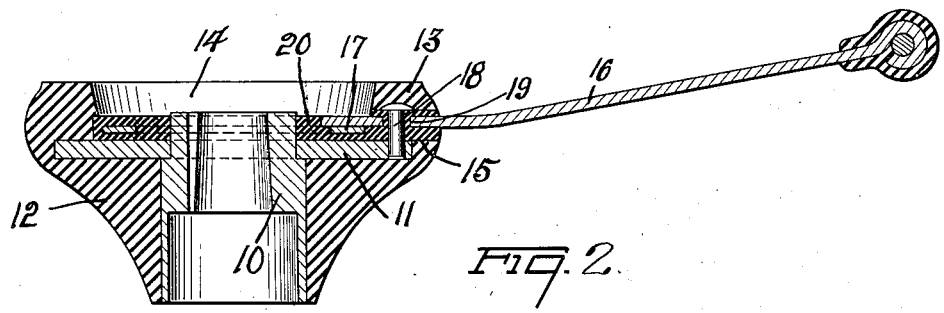

Figure 1 is a plan view of a steering wheel embodying the invention with a part broken away, and Fig. 2 is an enlarged section on the line 2—2 in Fig. 1.

In Figs. 1 and 2 the steering post (not shown) is mounted directly in the body member 10 of the wheel hub and an annular plate 11 is fixedly mounted on the upper end portion of such member to provide it with an annular flange. The hub is given suitable shape and finish, in the present instance, by covering the sides of the member 10 and bottom and rim portions of its flange 11 with a suitable composition 12, such, for instance, as hard vulcanized rubber, the upper rim portion of this covering forming an upstanding flange 13 over the outer edge portion of the flange 11. The flange 13 forms a cavity 14 in the top of the hub, the bottom of which is formed by the body members 10 and 11, and this cavity is provided in equidistantly spaced relation around its side wall or flange 13 with radial openings 15 for the free passage of the wheel spokes 16 therethrough.

The spokes 16, in the present instance, are of flat metal and have their inner ends rigidly connected together within the cavity by a ring 17 to which they are electrically welded, or otherwise suitably secured. The ring 17 is inwardly spaced with respect to the wall of the cavity 14 and is adapted, with the spokes 16, to have limited floating movements relative to the wheel hub. In order to positively limit such floating movements of the spokes and ring, the plate 11 is provided with one or more studs 18 for each spoke, which project through enlarged openings 19 provided in the spokes within the openings 15 of the hub. The spokes at their inner ends and the ring 17 are mounted in a resilient composition 20, such as soft rubber, which is disposed in the bottom of the cavity 4 and fills the hub openings 15 and spoke openings 19, respectively, around the spokes and studs respectively projecting therethrough. This provides a resilient connection between the spokes 16 and the hub and at the same time provides a positive limiting means for the resilient floating movements of the spokes or wheel spider relative to the hub.

It is apparent that with my invention the wheel spider has a resilient mount with respect to the steering post, with the shock absorbing means disposed within and forming a part of the hub construction and that in each case the spider portion of the wheel is not only permitted to have resilient floating movements angularly of the wheel axis, but universally with respect to the axis.

I wish it understood that my invention is not limited to any specific construction or form of the parts, as it is capable of numerous modifications and changes without departing from the spirit of the claims.

Having thus described my invention, what I claim as new and desire to secure by United States Letters Patent, is:

1. In a steering wheel, a hub portion and a spider portion having spokes, said hub portion having a body part for fixed engagement with a steering post and forming a cavity in its top with radial spoke-receiving openings in its side walls, a ring-like member disposed within said cavity and having fixed connection with the inner ends of the spider spokes projected inwardly through said openings, and a resilient material disposed in said cavity and openings in surrounding relation to the ring and respective portions of the spokes and permitting predetermined relative movements between the spider and body portion of the hub.

2. In a steering wheel, a hub portion having a cavity in its top part with radial spoke-receiving openings through its side walls, a spider having spokes projected inwardly through said openings for predetermined movements relative thereto and having connecting means for the spokes within the cavity, said spokes having one or more openings therethrough, means fixed to the hub and projecting through spoke openings in a manner to permit lateral movements of the spokes relative thereto, and a shock absorbing medium mounted in said cavity and openings and connecting the spider and hub to permit limited predetermined relative movements of the spider and hub.

3. In a steering wheel, a hub portion including a body member having an annular plate fixed to its upper end and forming a radial flange, and a molded part fixedly encircling said body member and plate and forming a cavity at the top of the hub portion, the bottom of which is formed by said member and plate, said cavity having radial openings in its side wall, a spider having spokes projected freely through said side openings and into said cavity and a yielding material disposed in said cavity and openings and anchoring the spider spokes therein for limited yielding movements in any direction.

4. In a steering wheel, a hub portion and a spider portion having spokes, said hub portion having a body part for fixed engagement with a steering post with an annular flange at its upper end and also having a covering molded to said body part and flange and forming a cavity at the top of the hub portion, the side wall of which overhangs the outer edge portion of said flange and has openings therein for receiving the spider spokes, said spider having a ring portion at the inner ends of its spokes and within said cavity, and means yieldingly disposed in said cavity and side openings and imbedding the inner portion of the spider therein to permit limited yielding movements of the spider relative to the hub portion.

MAGNUS M. BURGESS.